United States Patent
Turley et al.

(10) Patent No.: US 7,667,765 B2
(45) Date of Patent: Feb. 23, 2010

(54) DIGITAL IMAGING DEVICE SHUTTER CALIBRATION METHOD AND APPARATUS USING MULTIPLE EXPOSURES OF A SINGLE FIELD

(75) Inventors: Richard Turley, Ft. Collins, CO (US);
Dan L. Dalton, Greeley, CO (US);
Daniel M. Bloom, Loveland, CO (US);
Gregory V. Hofer, Loveland, CO (US);
Casey L. Miller, Fort Collins, CO (US);
Scott A. Woods, Bellvue, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 794 days.

(21) Appl. No.: 11/155,048

(22) Filed: Jun. 17, 2005

(65) Prior Publication Data
US 2006/0284993 A1    Dec. 21, 2006

(51) Int. Cl.
*H04N 5/238* (2006.01)
*H04N 5/335* (2006.01)
(52) U.S. Cl. .................. 348/364; 348/296; 348/297
(58) Field of Classification Search .............. 348/229.1, 348/243, 367, 296, 297, 36, 364, 180, 187
See application file for complete search history.

(56) References Cited

U.S. PATENT DOCUMENTS

| | | | | |
|---|---|---|---|---|
| 5,014,082 A | * | 5/1991 | Farrington | 396/235 |
| 5,606,392 A | * | 2/1997 | Tintera et al. | 396/161 |
| 6,831,695 B1 | * | 12/2004 | Tamayama | 348/362 |
| 7,030,923 B2 | * | 4/2006 | Ide et al. | 348/312 |
| 2003/0098922 A1 | * | 5/2003 | Barkan | 348/362 |

OTHER PUBLICATIONS

Richard Turley,et.al,HP pending appl.Pdno. 200405865-1, "Method and Apparatus for Exposure Correction in a Digital Imaging Device",U.S. Appl. No. 11/048,324,filed Jan. 31, 2005,35 pgs.
Richard Turley,et.al,HP pending appl.Pdno.200405866-1,"Method and Apparatus for Motion Estimation in a Digital Imaging Device",U.S. Appl. No. 11/048,403,filed Jan. 31, 2005,32 pgs.

* cited by examiner

*Primary Examiner*—Nhan T Tran
*Assistant Examiner*—Ahmed A Berhan

(57) ABSTRACT

The shutter of a digital imaging device may be calibrated by comparing a characteristic of two separate exposures obtained from a single field of the device's imaging sensor during a single exposure cycle. Calibrating the shutter in this manner facilitates the accuracy of even very short exposure times.

26 Claims, 6 Drawing Sheets

DIGITAL IMAGING DEVICE SHUTTER CALIBRATION METHOD AND APPARATUS USING MULTIPLE EXPOSURES OF A SINGLE FIELD

FIELD OF THE INVENTION

The present invention relates generally to digital photography and more specifically to techniques for calibrating the shutter of a digital imaging device.

BACKGROUND OF THE INVENTION

Imaging sensors used in digital imaging devices such as digital cameras rely on the storage of charge to represent the amount of light that has struck a particular sensor element. Under normal operation, an image exposure begins when the shutter is opened and the imaging sensor is electronically reset, and the exposure ends when the shutter closes. Since the shutter is a mechanical device, the exposure time is primarily determined by the accuracy of the shutter closing time.

Unfortunately, the actual shutter closing time is usually a function of several uncontrolled variables such as temperature, mechanical wear, camera orientation, and other factors. These factors vary in a non-linear manner with environment and over the life of the camera. Therefore, even calibration at the factory cannot fully compensate for this problem. These difficulties become especially apparent for very short exposure times (e.g., 1/2000 of a second and shorter).

It is thus apparent that there is a need in the art for an improved digital imaging device shutter calibration method and apparatus.

DETAILED DESCRIPTION OF THE INVENTION

Where a single field of an imaging sensor can be exposed multiple times during one exposure cycle (i.e., a single opening and closing of the shutter), information can be derived with which to calibrate the shutter. Take, for example, the case of two exposures of a single field during one exposure cycle.

The first exposure may be timed electronically to be quite precise. Therefore, it has a known duration. The precise duration of a second exposure that immediately follows the first exposure is not known a prior because it is subject to the inaccuracy of the mechanical shutter's closing time. However, given the known duration of the first exposure, it is possible to compare a characteristic of the two exposures to calculate the actual duration of the second exposure. Once that is known, the two known durations of the individual exposures may be added to obtain the actual duration of the exposure cycle. The difference between the actual exposure time and the desired exposure time constitutes the shutter error. The shutter may then be adjusted to compensate for the shutter error.

Figure 1A:
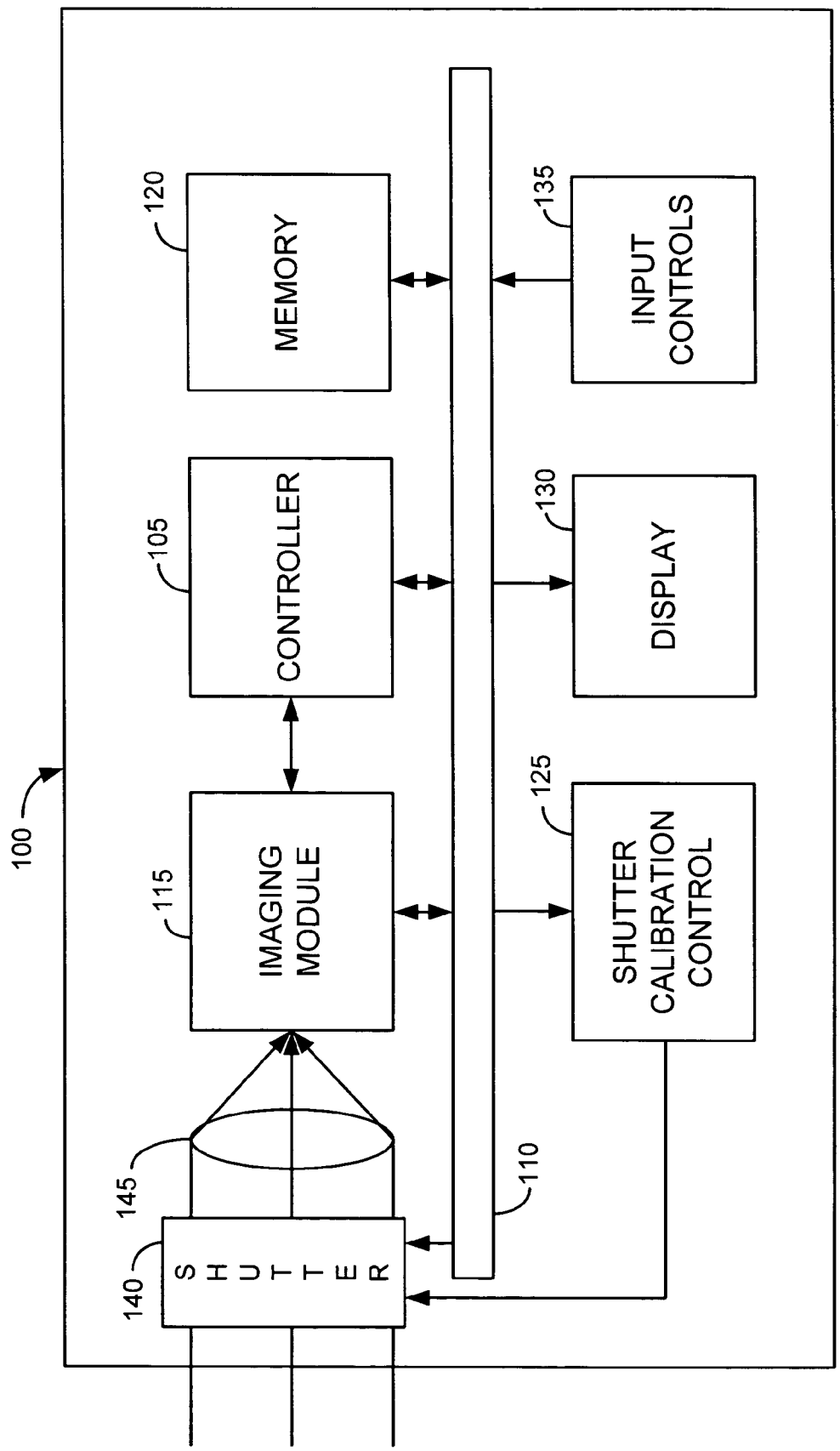
FIG. 1A is a functional block diagram of a digital imaging device in accordance with an illustrative embodiment of the invention.

FIG. 1A is a functional block diagram of a digital imaging device 100 in accordance with an illustrative embodiment of the invention. Digital imaging device 100 may be any device capable of converting an optical image of a scene to a digital image. Examples include, without limitation, digital cameras, digital camcorders, personal digital assistants (PDAs) with digital camera functionality, and radiotelephones (e.g., cellular or PCS phones) with digital camera functionality. In FIG. 1A, controller 105 may communicate over data/control bus 110 with imaging module 115, memory 120, shutter calibration control 125, display 130, input controls 135, and shutter 140. Controller 105 may comprise, e.g., a microprocessor or microcontroller. Shutter calibration control 125 may comprise a control circuit that provides for minute adjustment of the closing time of shutter 140 for a given shutter speed to compensate for shutter error. Shutter calibration control 125 may have an adjustable shutter calibration setting (e.g., a shutter lag calibration figure). Display 130 may be, for example, a liquid crystal display (LCD). Input controls 135 may comprise, e.g., a shutter button, user interface controls (physical or virtual), and any other input controls necessary to control the operation of digital imaging device 100. Optical system 145 produces optical images that are converted to digital images by imaging module 115.

Figure 1B:
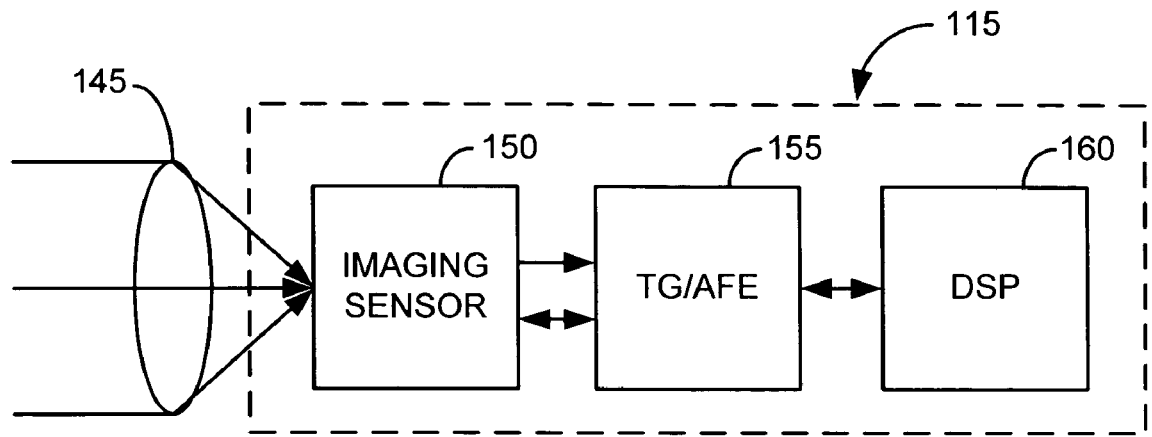
FIG. 1B is a functional block diagram of an imaging module of the digital imaging device shown in FIG. 1A in accordance with an illustrative embodiment of the invention.

FIG. 1B is a functional block diagram of imaging module 115 in accordance with an illustrative embodiment of the invention. Imaging module 115 may comprise an imaging sensor 150, a timing generator/analog front end (TG/AFE) 155, and a digital signal processor (DSP) 160. As indicated in FIG. 1A, imaging module 115, via DSP 160, may, in some embodiments, communicate directly with controller 105. As indicated in FIG. 1B, both data and control signals connect imaging sensor 150 and TG/AFE 155.

Figure 1C:
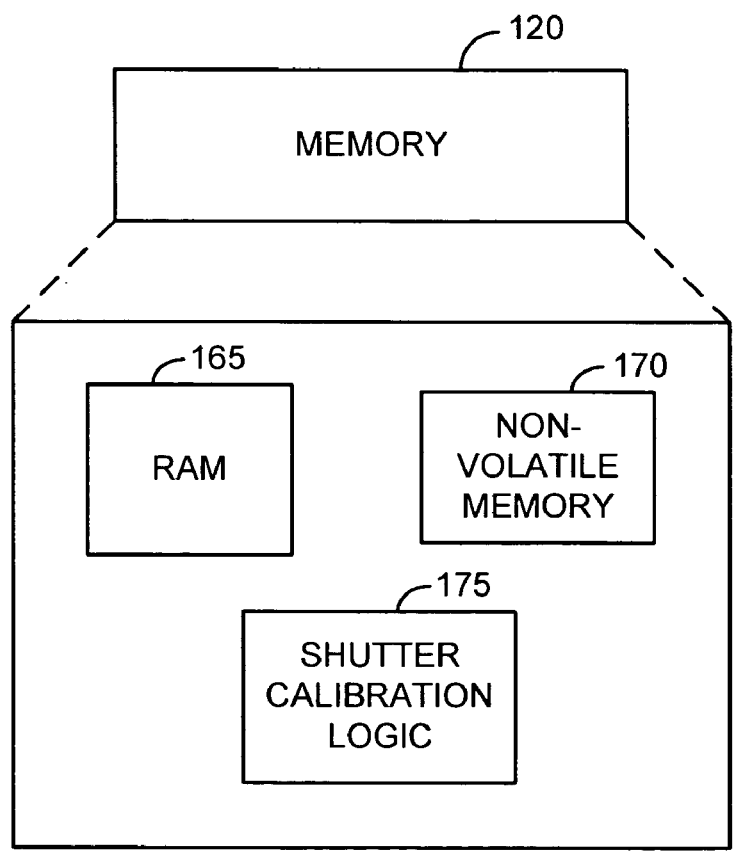
FIG. 1C is a functional diagram of the memory of the digital imaging device shown in FIG. 1A in accordance with an illustrative embodiment of the invention.

FIG. 1C is a functional diagram of memory 120 in accordance with an illustrative embodiment of the invention. Memory 120 may comprise random access memory (RAM) 165, non-volatile memory 170, and shutter calibration logic 175. In some embodiments, non-volatile memory 170 may be of the removable variety (e.g., a secure digital or multi-media memory card). The functionality of shutter calibration logic 175 will be explained in greater detail in later portions of this detailed description. In some embodiments, shutter calibration logic 175 may be merely one facet of an exposure control system of digital imaging device 100. In general, the functionality of shutter calibration logic 175 may be implemented in software, firmware, hardware, or any combination of thereof. For example, shutter calibration logic 175 may comprise firmware instructions that are executed by controller 105.

Figure 2A:
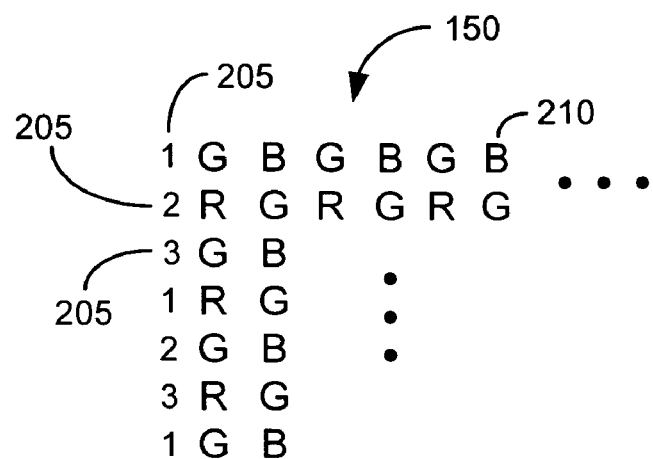
FIG. 2A is an illustration of a portion of a Bayer pattern associated with an imaging sensor in accordance with an illustrative embodiment of the invention.

FIG. 2A is an illustration of a portion of a Bayer pattern associated with imaging sensor 150 in accordance with an illustrative embodiment of the invention. In the particular illustrative embodiment shown in FIGS. 2A and 2B, imaging sensor 150 comprises a charge-coupled-device (CCD) imaging sensor array. In other embodiments, imaging sensor 150 may be based on some other technology (e.g., CMOS). As indicated in FIG. 2A, imaging sensor 150 may have a plurality of fields 205. In other embodiments, imaging sensor 150 may have only one field 205. An imaging sensor 150 in accordance with the principles of the invention may, in general, have one or more fields. A "field" may be defined as a set of rows of photosensors that can be read out of imaging sensor 150 as a unit. The fields, taken together, constitute an image "frame." In the example shown in FIG. 2A, imaging sensor 150 has three distinct fields 205, which are labeled "1," "2," and "3," respectively. The letters "R." "G," and "B," in FIG. 2A stand for, respectively, red, green, and blue color channels. Through the use of filters (not shown in FIG. 2A), each sensor element ("pixel") 210 is made sensitive to a specific one of the three colors.

A CCD sensor array in a conventional (prior-art) digital camera is typically operated as follows. All the fields of the CCD sensor array are simultaneously exposed to light for a predetermined period. Once the exposure is complete, one field of the CCD sensor array is transferred to an optically shielded shift register (sometimes called a "vertical shift register"). The field in the shift register is then clocked out of the device and stored in a memory external to the CCD sensor array. This process is repeated for each of the remaining fields of the CCD sensor array until all fields have been read from the CCD sensor array. The time required to transfer an entire field to the shift register is typically very brief (e.g., on the order of microseconds). However, the time required to clock data out of the shift register is typically much longer than the total exposure time. For example, though an exposure may be on the order of 1-10 ms, the time to read the image data associated with a single field from the shift register may be as long as 100 ms.

Figure 2B:
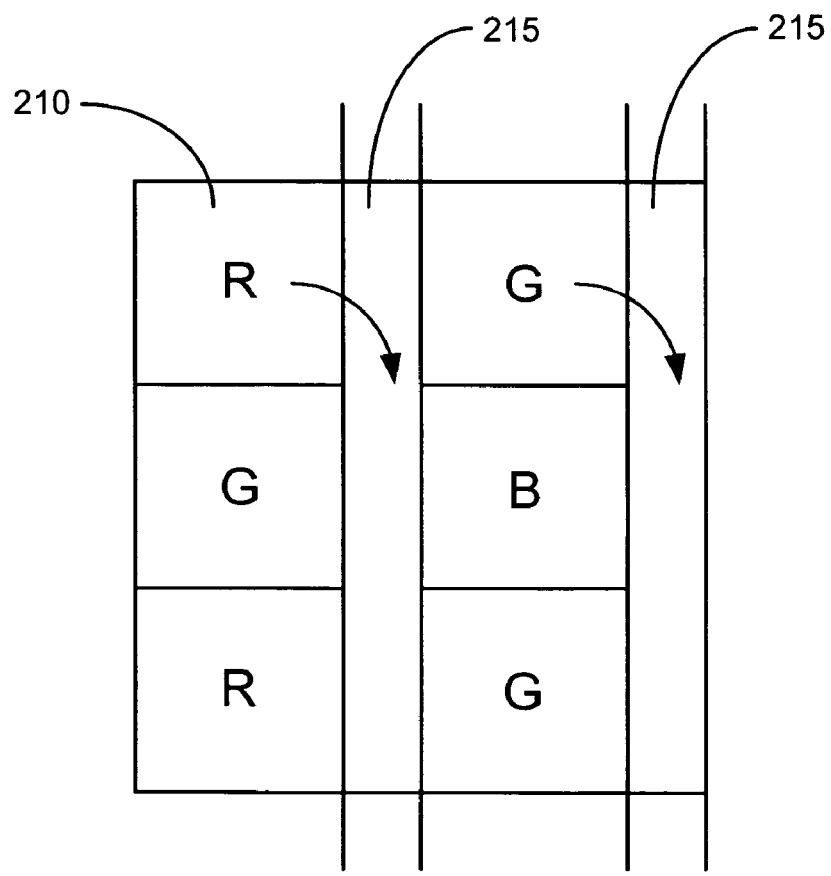
FIG. 2B is a diagram of a portion of a CCD sensor array in accordance with an illustrative embodiment of the invention.

FIG. 2B is a diagram of a portion of imaging sensor 150 in accordance with an illustrative embodiment of the invention. As indicated in FIG. 2B, pixels 210 from a particular field (any one of the N fields of imaging sensor 150, where N is an integer greater than or equal to one) may be transferred to optically shielded shift register ("shift register") 215. Shift register 215 may act, in effect, as an additional one-field memory in which an entire field of imaging sensor 150 may be stored until another field 205 (or another exposure of the same field 205) is loaded into shift register 215. This aspect of imaging sensor 150 may be exploited as shown in FIG. 3.

Figure 3:
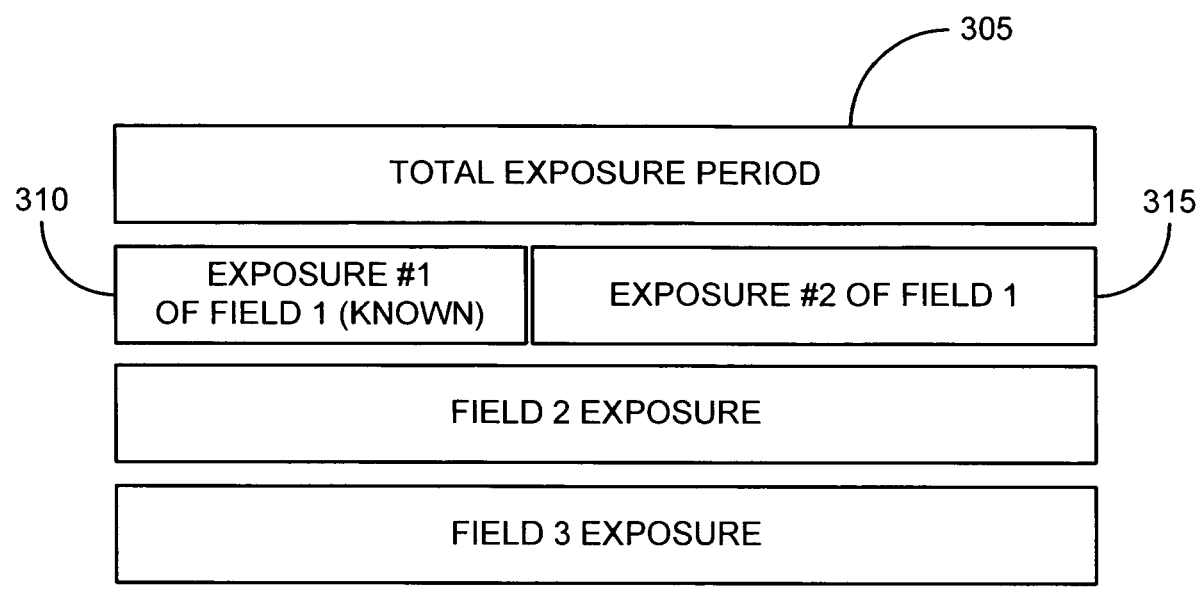
FIG. 3 is a diagram showing first and second exposures of a single field of an imaging sensor in accordance with an illustrative embodiment of the invention.

FIG. 3 is a diagram showing first and second exposures of a single field 205 of imaging sensor 150 in accordance with an illustrative embodiment of the invention. Shutter 140 may be held open for a total exposure period 305, during which two separate exposures (hereafter "Exposure #1" and "Exposure #2") may be captured from a single field 205 (without loss of generality, it will be assumed that this is Field 1 of the three fields 205 shown in FIG. 2A). This may be accomplished using the technique discussed in connection with FIG. 2B or its equivalent (i.e., any technique that allows a single field 205 to be exposed and read multiple times during total exposure period 305). As indicated in FIG. 3, Exposure #2 may immediately follow Exposure #1. Since Exposure #1 can be timed electronically with high precision by shutter calibration logic 175, it has a known duration 310. Since Exposure #2 ends whenever shutter 140 closes, its exact duration (315) is unknown. However, as will be explained below, the duration 315 of Exposure #2 can be determined by calculation.

If there are other fields in imaging sensor 150, they may be exposed for the entire total exposure period 305, as indicated in FIG. 3. If imaging sensor 150 is a CCD sensor array, its sensor elements are automatically reset (cleared) when Exposure #1 is transferred to shift register 215. With other types of imaging sensors 150 in other embodiments, it may be possible to read Exposure #1 non-destructively. That is, Exposure #2 may be additive to Exposure #1, in which case Exposure #2 may be obtained by subtracting Exposure #1 from the final digital image data of the field in question after it has been exposed for the total exposure period 305.

Figure 4A:
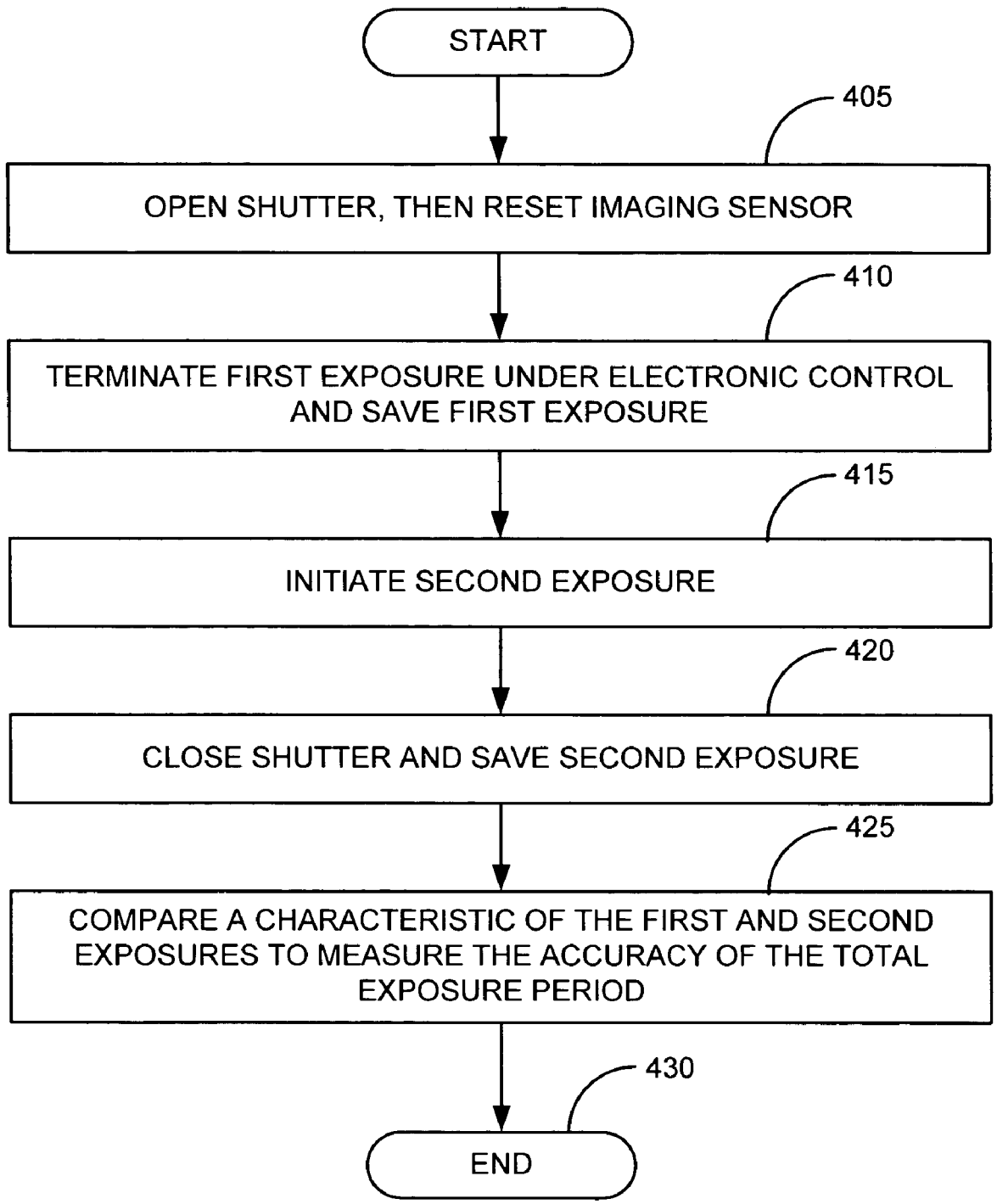
FIG. 4A is a flowchart of a method for calibrating the shutter of a digital imaging device in accordance with an illustrative embodiment of the invention.

FIG. 4A is a flowchart of a method for calibrating shutter 140 of digital imaging device 100 in accordance with an illustrative embodiment of the invention. The method of FIG. 4A may be carried out by shutter calibration logic 175 in cooperation with other elements (e.g., controller 105 and shutter calibration control 125) of digital imaging device 100. At 405, shutter 140 may be opened, and then imaging sensor 150 may be reset (cleared). At 410, shutter calibration logic 175 may terminate Exposure #1 under electronic control and save Exposure #1 (e.g., temporarily in shift register 215, if imaging sensor 150 is a CCD sensor array, and, ultimately, in memory 120). Shutter calibration logic 175 may initiate a second exposure of the same field 205 (Exposure #2) at 415. At 420, shutter 140 may be closed, and shutter calibration logic 175 may save Exposure #2 in memory 120. At 425, shutter calibration logic 175 may compare a characteristic of Exposure #1 and Exposure #2 to measure the accuracy of total exposure period 305. More details about how this comparison may be performed are provided in connection with FIG. 4B. The process of FIG. 4A may terminate at 430.

Figure 4B:
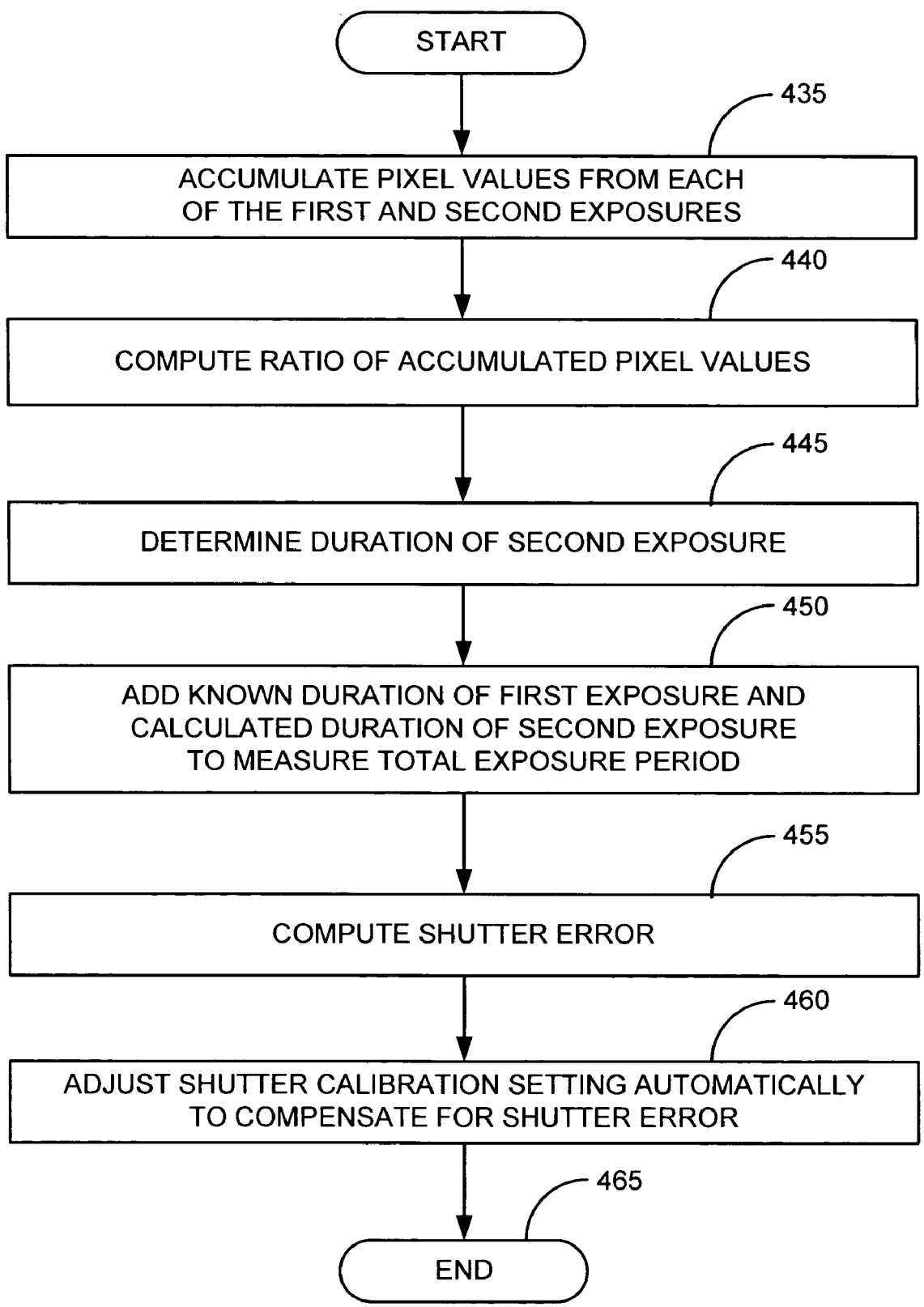
FIG. 4B is a flowchart of a method for comparing a characteristic of two exposures of a single field to measure the accuracy of a total exposure period in accordance with an illustrative embodiment of the invention.

FIG. 4B is a flowchart of a method for comparing a characteristic of two exposures (Exposure #1 and Exposure #2) of a single field 205 to measure the accuracy of total exposure period 305, in accordance with an illustrative embodiment of the invention. At 435, shutter calibration logic 175 may accumulate the pixel values in each of Exposure #1 and Exposure #2 to obtain a sum (a characteristic) for each exposure that can be compared. For example, shutter calibration logic 175 may accumulate the luminance of all pixels within each exposure or all the pixels in a particular color channel (e.g., green) within each exposure. Optionally, shutter calibration logic 175 may exclude from each accumulation any clipped pixels. To account for possible movement between Exposure #1 and Exposure #2, pixels in close proximity to clipped pixels may also be excluded. Also, shutter calibration logic 175 may normalize each accumulation according to the number of pixels accumulated to compute an average luminance or average green level, for example.

Whatever the precise figure of merit (normalized or unnormalized), let the accumulated pixel values of Exposure #1 be $A_1$, and let the accumulated pixel values of Exposure #2 be $A_2$. Also, let the known duration of Exposure #1 (310) and the unknown duration of Exposure #2 (315) be $T_1$ and $T_2$, respectively. Since the rate at which the sensor elements 210 of imaging sensor 150 charge is a constant, $A_1/T_1 = A_2/T_2$. Solving for the unknown $T_2$ yields $T_2 = T_1(A_2/A_1)$. Therefore, given the ratio of the accumulated pixel values in the two exposures and the known duration 310 of Exposure #1, the actual duration 315 of Exposure #2 can be calculated.

At 440, shutter calibration logic 175 may compute the ratio of the accumulated pixel values from Exposure #1 and Exposure #2 (e.g., $A_2/A_1$). Using this result, shutter calibration logic 175 may determine the duration 315 of Exposure #2 at 445. At 450, shutter calibration logic 175 may add known duration 310 of Exposure #1 and calculated duration 315 of Exposure #2 to measure total exposure period 305. At 455, shutter calibration logic 175 may compute the difference between the desired (expected) exposure period (i.e., the putative exposure time the user selected) and the measured total exposure period 305. At 460, shutter calibration logic 175 may automatically adjust the shutter calibration setting of shutter calibration control 125 to compensate for the shutter error. At 465, the process may terminate.

FIG. 4B shows merely one example of how a characteristic of Exposures #1 and #2 may be compared to measure the accuracy of total exposure period 305. In other embodiments, the details of the chosen characteristic and the underlying calculations may differ, but all such variations are considered to be within the contemplated scope of the invention as claimed.

The relative durations (310 and 315) of Exposure #1 and Exposure #2 may be chosen in accordance with the particular application. In one embodiment, duration 310 of Exposure #1 is selected to be half of the desired total exposure period. No set relationship is required, however, between the durations (310 and 315) of the two exposures. In general, each exposure (Exposure #1 or Exposure #2) should be sufficiently long to prevent noise from dominating the captured image data.

Digital imaging device 100 may use the techniques described above to perform frequent, even continual, automatic calibration of shutter 140 as digital imaging device 100 is used to take pictures, thereby improving the accuracy of exposures, especially for very short exposure times. Also, the above techniques may be used at the factory as part of a factory calibration regimen.

The foregoing description of the present invention has been presented for the purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for calibrating a shutter of a digital imaging device, comprising:
   capturing, throughout a total exposure period, first and second exposures from a field of an imaging sensor of the digital imaging device, the shutter remaining open for the total exposure period, the first exposure starting when the shutter opens and being terminated under electronic control before the total exposure period has elapsed, the first exposure having a known duration, the second exposure starting immediately following terminating of the first exposure and being terminated upon closing of the shutter; and
   comparing a characteristic of the first and second exposures, respectively, to obtain the actual duration of the total exposure period;
   wherein comparing the characteristic of the first and second exposures, respectively, to obtain the actual duration of the total exposure period comprises computing a ratio of accumulated pixel values from the first exposure to accumulated pixel values of the second exposure or computing a ratio of accumulated pixel values from the second exposure to accumulated pixel values of the first exposure.

2. The method of claim 1, wherein the accumulated pixel values from each of the first and second exposures comprise an average luminance.

3. The method of claim 1, wherein the accumulated pixel values from each of the first and second exposures are from a single color channel.

4. The method of claim 1, wherein, for each of the first and second exposures, clipped pixels are excluded from the accumulated pixel values.

5. The method of claim 1, further comprising:
   using the ratio to compute a duration of the second exposure; and
   summing the known duration of the first exposure and the duration of the second exposure to measure the total exposure period.

6. The method of claim 5, further comprising:
   determining a shutter error by comparing the measured total exposure period with a desired total exposure period; and
   adjusting automatically a shutter calibration setting to compensate for the shutter error.

7. The method of claim 1, wherein the field is cleared between the first and second exposures.

8. A method for calibrating a shutter of a digital imaging device, comprising:
   initiating a first exposure of a field of an imaging sensor of the digital imaging device by opening the shutter and electronically resetting the imaging sensor;
   holding the shutter open for a total exposure period;
   terminating the first exposure under electronic control after a predetermined exposure period has elapsed and before the total exposure period has elapsed;
   initiating a second exposure of the field immediately after termination of the first exposure, the second exposure being terminated upon closing of the shutter; and
   comparing a characteristic of the first and second exposures, respectively, to measure the actual duration of the total exposure period;
   wherein comparing the characteristic of the first and second exposures, respectively, to measure the accuracy of the total exposure period comprises computing a ratio of accumulated pixel values from the first exposure to accumulated pixel values of the second exposure or computing a ratio of accumulated pixel values from the second exposure to accumulated pixel values of the first exposure.

9. The method of claim 8, wherein the accumulated pixel values from each of the first and second exposures comprise an average luminance.

10. The method of claim 8, wherein the accumulated pixel values from each of the first and second exposures are from a single color channel.

11. The method of claim 8, wherein, for each of the first and second exposures, clipped pixels are excluded from the accumulated pixel values.

12. The method of claim 8, further comprising:
    using the ratio to compute a duration of the second exposure; and
    summing the predetermined exposure period and the duration of the second exposure to measure the total exposure period.

13. The method of claim 12, further comprising:
    determining a shutter error by comparing the measured total exposure period with a desired total exposure period; and
    adjusting automatically a shutter calibration setting to compensate for the shutter error.

14. The method of claim 8, wherein the field is cleared between the first and second exposures.

15. A digital imaging device, comprising:
a shutter;
an imaging sensor comprising at least one field; and
shutter calibration logic configured to carry out a method comprising:
   capturing, throughout a total exposure period, first and second exposures, from a field of the imaging sensor, the shutter remaining open for the total exposure period, the first exposure being terminated under electronic control before the total exposure period has elapsed, the first exposure having a known duration, the second exposure being terminated upon closing of the shutter, a sum of the first exposure and the second exposure equaling the total exposure period; and
   comparing a characteristic of the first and second exposures, respectively, to measure the accuracy of the total exposure period;
wherein comparing a characteristic of the first and second exposures, respectively, to measure the accuracy of the total exposure period comprises computing a ratio of accumulated pixel values from the first exposure to accumulated pixel values of the second exposure or computing a ratio of accumulated pixel values from the second exposure to accumulated pixel values of the first exposure.

16. The digital imaging device of claim 15, wherein the accumulated pixel values from each of the first and second exposures comprise an average luminance.

17. The digital imaging device of claim 15, wherein the accumulated pixel values from each of the first and second exposures are from a single color channel.

18. The digital imaging device of claim 15, wherein the shutter calibration logic is configured to exclude clipped pixels from the accumulated pixel values of each of the first and second exposures.

19. The digital imaging device of claim 15, wherein the method further comprises:
   using the ratio to compute a duration of the second exposure; and
   summing the known duration of the first exposure and the duration of the second exposure to measure the total exposure period.

20. The digital imaging device of claim 19, wherein the method further comprises:
   determining a shutter error by comparing the measured total exposure period with a desired total exposure period; and
   adjusting automatically a shutter calibration setting of the digital imaging device to compensate for the shutter error.

21. The digital imaging device of claim 15, wherein the method further comprises clearing the field between the first and second exposures.

22. A digital imaging device, comprising:
a shutter;
an imaging sensor comprising at least one field; and
shutter calibration logic configured to carry out a method comprising:
   initiating a first exposure of a field of the imaging sensor by opening the shutter and electronically resetting the imaging sensor;
   holding the shutter open for a total exposure period;
   terminating the first exposure under electronic control after a predetermined exposure period has elapsed and before the total exposure period has elapsed;
   initiating a second exposure of the field immediately after termination of the first exposure, the second exposure being terminated upon closing of the shutter; and
   comparing a characteristic of the first and second exposures, respectively, to measure the accuracy of the total exposure period;
wherein comparing the characteristic of the first and second exposures, respectively, to measure the accuracy of the total exposure period comprises computing a ratio of accumulated pixel values from the first exposure to accumulated pixel values of the second exposure or computing a ratio of accumulated pixel values from the second exposure to accumulated pixel values of the first exposure.

23. The digital imaging device of claim 22, wherein the method further comprises:
   using the ratio to compute a duration of the second exposure; and
   summing the predetermined exposure period and the duration of the second exposure to measure the total exposure period.

24. The digital imaging device of claim 23, wherein the method further comprises:
   determining a shutter error by comparing the measured total exposure period with a desired total exposure period; and
   adjusting automatically a shutter calibration setting of the digital imaging device to compensate for the shutter error.

25. The digital imaging device of claim 22, wherein the method further comprises clearing the field between the first and second exposures.

26. A digital imaging device, comprising:
means for selectively admitting illumination;
means for converting optical images to digital images, the means for converting optical images to digital images having at least one field; and
means for calibrating the means for selectively admitting illumination configured to carry out a method comprising:
   capturing, throughout a total exposure period, first and second exposures from a field of the means for converting optical images to digital images, the means for selectively admitting illumination admitting illumination for the total exposure period, the first exposure being terminated under electronic control before the total exposure period has elapsed, the first exposure having a known duration, the second exposure being terminated when the means for selectively admitting illumination ceases to admit illumination; and
   comparing a characteristic of the first and second exposures, respectively, to measure the actual duration of the total exposure period;
wherein comparing the characteristic of the first and second exposures, respectively, to measure the actual duration of the total exposure period comprises computing a ratio of accumulated pixel values from the first exposure to accumulated pixel values of the second exposure or computing a ratio of accumulated pixel values from the second exposure to accumulated pixel values of the first exposure.

* * * * *

UNITED STATES PATENT AND TRADEMARK OFFICE
CERTIFICATE OF CORRECTION

| | | |
|---|---|---|
| PATENT NO. | : 7,667,765 B2 | Page 1 of 1 |
| APPLICATION NO. | : 11/155048 | |
| DATED | : February 23, 2010 | |
| INVENTOR(S) | : Richard Turley et al. | |

It is certified that error appears in the above-identified patent and that said Letters Patent is hereby corrected as shown below:

In column 7, line 7, in Claim 15, delete "exposures," and insert -- exposures --, therefor.

In column 8, line 46, in Claim 26, after "selectively" delete "admitting illumination".

Signed and Sealed this

Twenty-ninth Day of June, 2010

David J. Kappos
*Director of the United States Patent and Trademark Office*